(12) United States Patent
Buckby et al.

(10) Patent No.: US 10,915,277 B2
(45) Date of Patent: Feb. 9, 2021

(54) METHOD AND APPARATUS FOR SECURING PERIPHERAL DEVICES

(71) Applicant: Videojet Technologies Inc., Wood Dale, IL (US)

(72) Inventors: Steven John Buckby, Nottingham (GB); Gary Pfeffer, Nottingham (GB); Jeremy Ellis, Nottingham (GB); Philip Hart, Nottingham (GB)

(73) Assignee: VIDEOJET TECHNOLOGIES INC., Wood Dale, IL (US)

( * ) Notice: Subject to any disclaimer, the term of this patent is extended or adjusted under 35 U.S.C. 154(b) by 0 days.

(21) Appl. No.: 16/083,238

(22) PCT Filed: Feb. 28, 2017

(86) PCT No.: PCT/GB2017/050544
§ 371 (c)(1),
(2) Date: Sep. 7, 2018

(87) PCT Pub. No.: WO2017/153715
PCT Pub. Date: Sep. 14, 2017

(65) Prior Publication Data
US 2019/0102124 A1 Apr. 4, 2019

(30) Foreign Application Priority Data

Mar. 9, 2016 (GB) .................................. 1604068.5

(51) Int. Cl.
*G06F 3/12* (2006.01)
*B41J 35/36* (2006.01)

(52) U.S. Cl.
CPC ............ *G06F 3/1239* (2013.01); *B41J 35/36* (2013.01); *G06F 3/1205* (2013.01); (Continued)

(58) Field of Classification Search
CPC .... G06F 3/1239; G06F 3/1205; G06F 3/1289; G06F 3/1222; G06F 3/1238; G06F 3/1285; B41J 35/36
See application file for complete search history.

(56) References Cited

U.S. PATENT DOCUMENTS

2002/0097431 A1* 7/2002 Ikegami ................ G06F 21/608
358/1.15
2002/0134829 A1* 9/2002 Tanaka ................ B41J 2/17546
235/375

(Continued)

FOREIGN PATENT DOCUMENTS

JP 2008097075 A 4/2008
WO 2013019186 A1 2/2013

*Primary Examiner* — Neil R McLean
(74) *Attorney, Agent, or Firm* — Wolter Van Dyke Davis, PLLC; Robert L. Wolter (57) ABSTRACT

A printing machine comprising a processor and a memory storing computer readable instructions. The computer readable instructions are arranged to cause the processor to generate access request data for processing by an access control server, receive access response data responsive to the access request data, process the access response data to determine a first print limit indicated by the access response data, and update, responsive to processing the access response data, an access status in the memory to indicate a second print limit.

23 Claims, 4 Drawing Sheets

(52) U.S. Cl.
CPC .......... *G06F 3/1222* (2013.01); *G06F 3/1238* (2013.01); *G06F 3/1285* (2013.01); *G06F 3/1289* (2013.01)

(56) References Cited

U.S. PATENT DOCUMENTS

| | | |
|---|---|---|
| 2005/0275868 A1 | 12/2005 | Higashiura et al. |
| 2007/0229873 A1 | 10/2007 | Kato |
| 2008/0204807 A1 | 8/2008 | Nakatsuka |
| 2010/0097420 A1* | 4/2010 | Nishizaka ................. B41J 3/46 347/14 |
| 2013/0215210 A1* | 8/2013 | McNestry ................ B41J 35/36 347/214 |
| 2014/0160519 A1* | 6/2014 | Jeran ..................... G06F 3/1203 358/1.14 |

\* cited by examiner

METHOD AND APPARATUS FOR SECURING PERIPHERAL DEVICES

The present invention relates to the securing of peripheral devices such as printing machines through the control of access rights.

It may be desirable to securely and controllably restrict the ability to use printing machines, for example where printing machines may be placed at locations in which sensitive material may be circulated.

It is an object of at least some embodiments of the present invention to provide a new way to secure printing machines or to obviate or mitigate one or more problems of the prior art.

According to a first aspect described herein, there is provided a printing machine. The printing machine comprises a processor and a memory storing computer readable instructions. The computer readable instructions are arranged to cause the processor to generate access request data for processing by an access control server, to receive access response data responsive to the access request data, to process the access response data to determine granted first print limit indicated by the access response data, and to update, responsive to processing the access response data, an access status in the memory to indicate a second print limit.

By generating access request data at the printing machine and receiving corresponding access response data from an access control server, access to the printing function of the printing machine can be controlled.

The request for access to a printing function may be received any appropriate way. For example, the printing machine may not provide input means for a user to provide the request directly to the printing machine. In this case, the request for access to the printing function may be received from a user device connected to the printing machine. The user device may, for example, be connected using a wireless short range communications protocol such as Bluetooth.

The computer readable instructions may be arranged to cause the processor to encrypt and/or cryptographically sign the access request data.

The computer readable instructions may be arranged to cause the processor to include a unique identifier of the printing machine in the access request data.

The computer readable instructions may be arranged to cause the processor to process the access response data to verify that the access response data includes the unique identifier of the printing machine.

To process the access response data, the computer readable instructions may be arranged to cause the processor to verify that the access response data originates at the access control server.

The computer readable instructions may be arranged to cause the processor to update the access status from a third print limit to the second print limit. That is, prior to the updating, the access status may indicate the third print limit. The second print limit may be based upon both of the first print limit and the third print limit. For example, the second print limit may be the sum of the first print limit and the third print limit.

It will be appreciated that the print limit may indicate any quantity and that the quantity used may depend upon the type of printing device. For example, the first, second and/or third print limit may be at least one of a duration, a time period, a print distance, a length, a number (such as a number of pages, a number of items, etc.) or a quantity of ink. Additionally, the print limit may indicate a binary state wherein printing is either permitted or not permitted.

The computer readable instructions may be arranged to cause the processor to receive a print request indicating material to be printed, to determine that the access status indicates that the print request may not be executed, and to deny the print request. The material to be printed may take any form. For example, the material to be printed may take the form of a number, indicating a number of units to be printed. That is, the actual image/text to be printed may be predetermined, such that the print request may simply indicate the number of times that image/text is to be printed.

The computer readable instructions may be arranged to cause the processor to receive a second print request indicating second material to be printed, to determine that the access status indicates that the second print request may be executed, and to execute the second print request by printing at least a part of the second material to be printed.

The instructions may be arranged to cause the processor to update the access status stored in the memory in response to executing the print request.

The computer readable instructions may be arranged to cause the processor to receive a third print request indicating third material to be printed, to determine based on the access status stored in the memory that the third print request cannot be executed in its entirety, and to refuse the third print request or to print only a part of the third material to be printed, the part being determined based upon the access status.

The access status may specify a print distance. To determine that the third print request cannot be executed in its entirety, the instructions may be arranged to cause the processor to determine a print distance of the third material to be printed and to compare the print distance of the third material to a print distance specified in the access status.

According to a second aspect described herein, there is provided a system comprising a printing machine according to the first aspect and an access control server comprising a server processor and a memory storing computer readable instructions. The computer readable instructions are arranged to cause the server processor to receive access request data requesting access to a printing function of the printing machine, process the access request data to determine an identifier of the printing machine, retrieve access control information from the memory based on the determined identifier, determine, based on the retrieved access control information granted first print limit, generate access response data indicating the first print limit, and update the access control information stored in the memory to indicate issuance of the access response data.

The request for access to a printing function may be, for example, a request to increase an existing print limit associated with the printing machine. The instructions may be arranged to cause the server processor to encrypt and/or cryptographically sign the access response data.

The system may further comprise a user device comprising a user device processor and a memory storing computer readable instructions. The computer readable instructions are arranged to cause the user device processor to receive the access request data from the printing machine for onward transmission, and to receive the access response data.

The system may further comprise a distributor device comprising a distributor device processor and a memory storing computer readable instructions. The computer readable instructions may be arranged to cause the distributor device processor to receive the access request data, and transmit the access request data to the access control server.

The instructions stored in the memory of the access control server may be arranged to cause the server processor to determine, based on a distributor identifier in the access request data that the request for access to the printing function may be granted.

The instructions stored in the memory of the distributor device may be arranged to cause the distributor device processor to receive the access response data from the access control server, and to transmit the access control data to the printing machine.

According to a third aspect described herein, there is provided a method for controlling access to a printing function of a printing machine, comprising, at the printing machine generating access request data for processing by an access control server, receiving access response data responsive to the access request data, processing the access response data to determine a first print limit indicated in the access response data, and updating, responsive to determining the access right, the access status in the memory to indicate a second print limit.

The method may further comprise encrypting and/or cryptographically signing the access request data.

The method may further comprise including a unique identifier of the printing machine in the access request data.

The method may further comprise processing at the printing machine the access response data to verify that the access response data includes the unique identifier of the printing machine.

Processing the access response data may comprise verifying that the access response data originates at the access control server.

The method may further comprise updating the access status from indicating a third print limit to indicate the second print limit.

The print limit may be at least one of a duration, a time period, a print distance, a length, a number (such as a number of pages, a number of items, etc.) or a quantity of ink.

The method may further comprise receiving a print request indicating material to be printed, determining that the access status indicates that the print request may not be executed, and denying the print request.

The method may further comprise receiving a second print request indicating second material to be printed, determining that the access status indicates that the second print request may be executed, and executing the second print request by printing at least a part of the second material to be printed.

The method may further comprise updating the access request to indicate a new print limit in response to executing the second print request.

The method may further comprise receiving a third print request indicating third material to be printed, determining based on the access status stored in the memory that the third print request cannot be executed in its entirety, and refusing the third print request or printing only a part of the third material to be printed, the part being determined based upon access status.

The access status may specify a print distance and determining that the third print request cannot be executed in its entirety may comprise determining a print distance of the third material and comparing the print distance of the third material to the print distance specified in the access status.

According to a fourth aspect described herein, there is provided a computer readable medium carrying computer readable instructions arranged to cause a processor to carry out the method of the third aspect.

In each of the aspects discussed above, the printing machine may be a thermal transfer printer. The print distance may be a length of ribbon. Alternatively, the printing machine may a different kind of printing machine, such as an inkjet printer. The print distance may be any other measure, such as a quantity of ink.

Where features have been described above in the context of one aspect of the invention, it will be appreciated that where appropriate such features may be applied to other aspects of the invention. Indeed, any of the features described above and elsewhere herein can be combined in any operative combination and such combination is expressly foreseen in the present disclosure.

To the extent appropriate, methods described herein may be implemented by way of suitable computer programs and as such computer programs comprising processor readable instructions arranged to cause a processor to execute such control methods are provided. Such computer programs may be carried on any appropriate carrier medium (which may be a tangible or non-tangible carrier medium).

Embodiments of the invention are now described, by way of example only, with reference to the accompanying drawings, in which.

Figure 1:
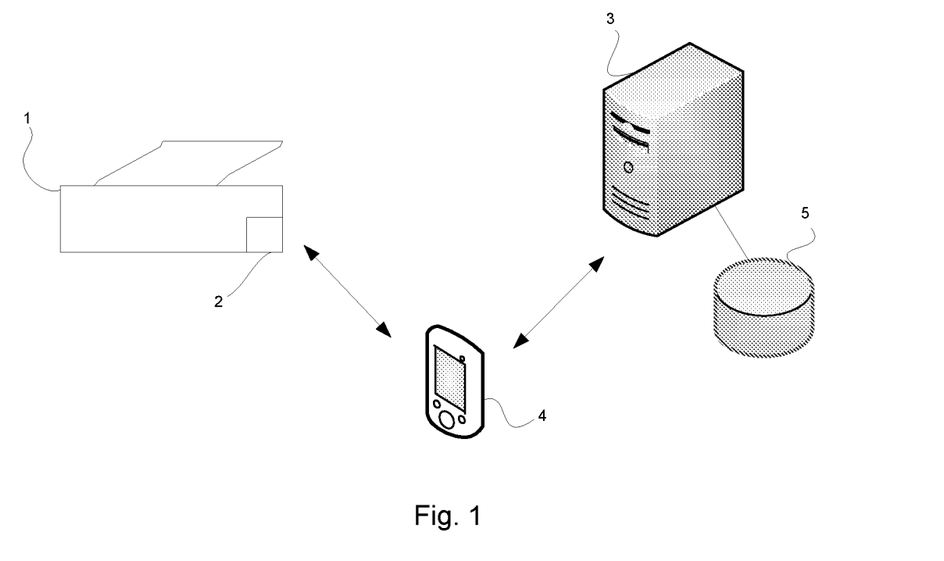
FIG. 1 is a schematic illustration of a printing machine and that may be used in some embodiments.

FIG. 1 schematically illustrates printing machine 1. The printing machine 1 has printing functions to which it is desired to control access. The printing machine 1 is provided with a controller 2. It will be appreciated that reference below to processing operations being performed by the printing machine 1 may be performed by the controller 2.

Figure 2:
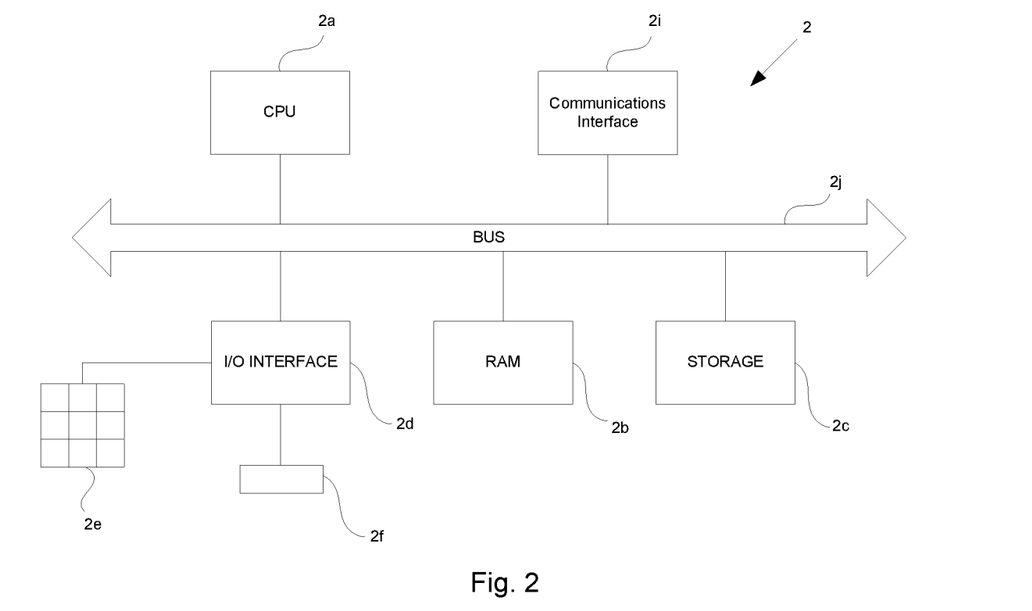
FIG. 2 is a schematic illustration of exemplary components that may be provided by the printing machine of FIG. 1.

FIG. 2 schematically illustrates components of the controller 2 of the printing machine 1 in accordance with an exemplary embodiment. It can be seen that the controller 2 comprises a CPU 2a which is configured to read and execute instructions stored in a RAM memory 2b which may be a volatile memory. The RAM 2b stores instructions for execution by the CPU 2a and data used by those instructions. For example, instructions may be provided to control a printing function of the printing machine 1. Further instructions may be provided to cause the controller 2 to perform actions to control access to printing functions of the printing machine 1.

The controller 2 further comprises non-volatile storage 2c, such as, for example, a hard disk drive, although it will be appreciated that any other form of non-volatile storage may be used. Computer readable instructions for controlling printing functions and for controlling access to printing functions of the printing machine 1 may be stored in the non-volatile storage 2c. The controller 2 further comprises an I/O interface 2d to which peripheral devices used in connection with the printing machine 1 may be connected. For example, an input 2e (shown in the form of a keypad) may be provided to allow user interaction with the printing machine 1. While not shown, it will be appreciated that other input or output devices may be connected to the I/O interface, such as a display. In other embodiments, however, the printing machine 1 may not be provided with means for a user to interact directly with the printing machine 1. Interaction with the printing machine 1 may be entirely through a connected device.

The I/O interface 2*d* may further comprise a port 2*f* to allow the connection of I/O devices, such as data storage devices. For example, the port 2*f* may be a USB port to allow connection of USB flash drives. A communications interface 2*i* may also be provided. The communications interface 2*i* may provide for short range connections to other devices (e.g. via Bluetooth, near-field communication (NFC), etc.), and/or for connection to networks such as the Internet, for longer range communication. The CPU 2*a*, RAM 2*b*, non-volatile storage 2*c*, I/O interface 2*d* and communications interface 2*i* are connected together by a bus 2*j*.

It will be appreciated that the arrangement of components illustrated in FIG. 2 is merely exemplary, and that the controller 2 may comprise different, additional or fewer components than those illustrated in FIG. 2. Additionally, it will be appreciated that the printing machine 1 will comprise other components for performing printing functions which are not illustrated in FIG. 2.

Referring again to FIG. 1, the printing machine 1, through the controller 2, is configured to communicate with an access control server 3. In the embodiment of FIG. 1, the printing machine 1 is configured to communicate with the access control server 3 via a user device 4. In FIG. 1 the user device 4 is depicted in the form of a mobile computing device such as a smartphone. It will be understood, however, that the user device 4 may take any form. For example, the user device 4 may be a desktop computer, a laptop computer or a server. The printing machine 1 may be arranged to communicate with the user device 4 via any means. For example, the printing machine 1 may have a wired connection to the user device 4 (such as a USB connection). The printing machine 1 may connect to the user device 4 over a wireless connection. Such a wireless connection may use a short range communications protocol such as Bluetooth, for example. The user device 4 is arranged to communicate with the access control server 3 via suitable networks, such as the Internet. It is to be understood, however, that the arrangement of FIG. 1 is merely exemplary.

In other embodiments, for example, the printing machine 1 may be configured to communicate directly with the access control server 3. In further alternative embodiments, the printing machine 1 may not comprise a suitable interface for direct connection and communication with the user device 4. In such a case, communication between the printing machine 1 and the user device 4 may be through the manual transfer of files. For example, data may be provided to, and received from, the printing machine 1 via external storage devices which may connect to the port 2*f*.

The access control server 3 is configured to maintain access control information for the printing machine 1 in a database 5. The access control server 3 may maintain access control information for each of a plurality of printing machines and/or other devices. As is described in more detail below with reference to FIGS. 3 to 5, the controller 2 and the access control server 3 operate together to control access to printing functions of the printing machine 1.

Figure 3A:
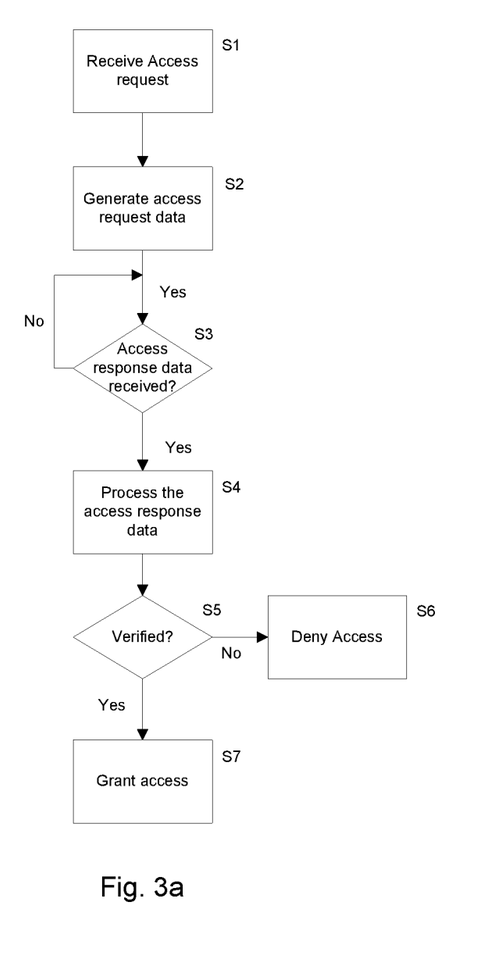
FIGS. 3a, 3b are flowcharts showing processing that may be carried out by the printing machine of FIG. 1.

Processing that is performed by the controller 2 is now described in more detail, with reference to FIG. 3*a*. At step S1 the controller 2 is receives an access request from a potential user of the printing machine 1—i.e., someone who wishes to use a printing function of the printing machine 1. The access request may take any suitable form and the controller 2 may receive the access request in any suitable manner. Indeed, it will be appreciated from the above that the manner in which the controller 2 receives the access request may vary in dependence upon the functionality and communications capabilities of the controller 2. For example, where the controller 2 provides user input means (such as the key pad 2*e*) a user may interact directly with the printing machine 1 to input an access request. In other embodiments, the user may interact with the controller 2 through the user device 4. The user device 4 may connect to the controller 2 via any suitable means, such as Bluetooth or near-field communication (NFC). In this way, a suitable user interface may be provided on the user device 4 to allow the user to interact with the printing machine 1 and to provide the access request. The user device 4 may, for example, run a local application, or access a remotely hosted application (e.g. a "web application"), that allows the user device 4 to communicate with the controller 2.

The access request may include additional information relating to the intended use of the printing machine 1. For example, the access request may specify additional details such as a quantity of prints requested (measured in any appropriate unit, such as print distance, number of pages, number of units to be printed, lengths of ribbon, quantity of ink), a time period, an identifier of the particular user making the access request, or any other details which may be required in a particular application to make a decision as to whether the access request should be granted. The access request may have any appropriate format.

In response to receiving the access request at step S1, the controller 2 generates an access request file at step S2. The access request file includes a unique identifier of the printing machine 1 and may include additional information relating to the access request such as a quantity of prints, a time of the access request and any other information required by the access control server 3 to determine whether to grant the access request. The access control file may be encrypted by the controller 2. For example, the controller 2 may utilise an asymmetric encryption algorithm with the access control file encrypted using a public key of the access control server 3. In this way only the access control server 3 can decrypt the access control file using its private key. The controller 2 may additionally or alternatively cryptographically sign the access control file using its private key to allow the access control server 3 to verify that the controller 2 is the source of the access request file (by decrypting the signature using the public key of the printing machine 1/controller 2). Any appropriate public key algorithms may be used, such as RSA. Other methods of encryption and verification, such as symmetric key algorithms, may also be used as will be apparent to the skilled person. It is to be understood that while described as a "file" herein for clarity and convenience, the access request may take any appropriate form and may be a plurality of files. The access request file may therefore, more generally, be access request data.

The processing of FIG. 3*a* proceeds to step S3 where the controller 2 awaits a response to the access request file, in the form of an access response file, from the access control server 3. While an access response file has not been received, processing loops at step S3.

Figure 3B:
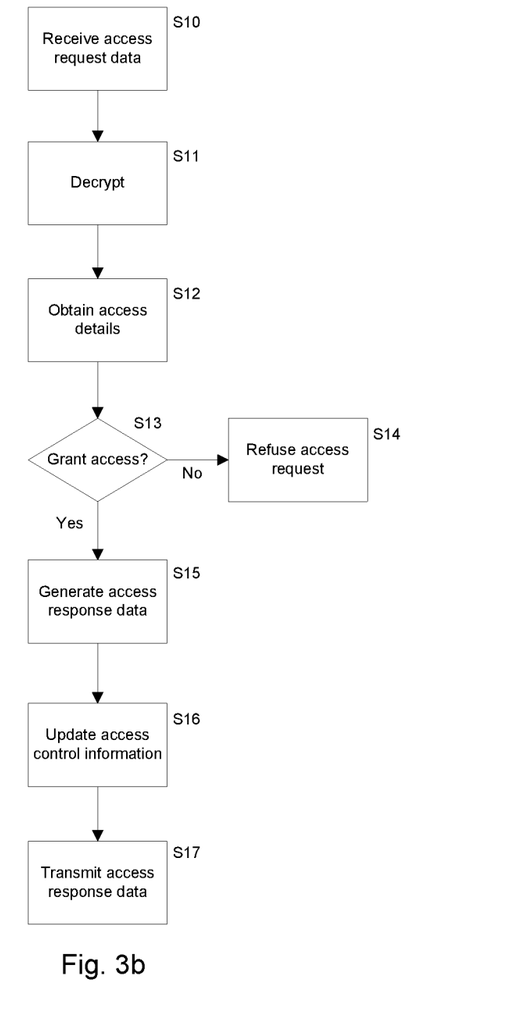

Turning to FIG. 3*b*, processing performed by the access control server 3 is now described. At step S10 the access control server 3 receives the access request file generated by the controller 2. The access request file may be provided to the access control server 3 via any appropriate mechanism. For example, where the printing machine 1 is connected to the access control server 3 via a network, the printing machine 1 may transmit the access request file to the access control server 3. Alternatively, the access request file may be provided to the user for onward transmission to the access control server 3. For example, the access control file may be saved by the controller 2 to an external storage device (such as a USB flash drive) for the user to transfer the file to the user device 4, or may be directly transmitted from the controller 2 to the user device 4 (for example, via Bluetooth). The access request file may then be transmitted from the user device 4 to the access control server 3 using any appropriate mechanism. In one embodiment, a user of the user device 4 may use a general electronic communication application running on the user device 4 (such as an email client) to send the access request file to the access control server 3 (i.e., to an email account accessible to software operating on the access control server 3). As an alternative example, where an access control application runs on the user device 4, the access control application may be arranged to communicate with the access control server 3.

Upon receipt of the access request file at the access control server 3 at step S10, processing passes to step S11 to obtain the identifier of the printing machine 1, and any other information which is contained in the access request file. For example, where the access request file is encrypted, the access control server 3 may decrypt the access control file at step S11. Where the access request file includes a signature, the access control server 3 may verify the signature to determine that the source of the access request file is the printing machine 1/controller 2. At step S12, the access control server 3 uses the identifier of the printing machine 1 to obtain access control information stored in the database 5. The database 5 may, for example, store an access status for the printing machine 1. The access status provides an indication as to whether an access request can or cannot be granted for the printing machine 1.

It will be appreciated that in some embodiments the database 5 may include additional access control information. For example, the database 5 may store records relating to previous access requests, and may store rules to be applied when determining whether to grant an access request for the printing machine 1. By way of example only, the access control server 3 may be configured to, based on the access control information for the printing machine 1, deny access requests where a previous access request has been granted in a predetermined time period. In a further alternative example, the access control information may be manually updated to indicate that access requests should or should not be granted. More generally, it will be appreciated from the above that the access control information stored in the database 5 may be maintained in any appropriate manner as dependent upon particular access control requirements.

It is determined at step S13 whether the access request should be granted. If it is determined at step S13 that access should not be granted, processing may end at step S14 with the control server 3 refusing to grant the access request. The access request may be refused based on the access control information contained in the database 5, if the identifier specified in the access request cannot be verified (e.g. if it cannot be located in the database 5), or for other reasons. A suitable message may be generated at step S14 and provided to the user to indicate refusal to grant the access request. As described above, communication of such messages to the user may be via the printing machine 1 where it is provided with a suitable network connection, or via the user device 4.

If, on the other hand, it is determined at step S13 that the access request should be granted, processing passes to step S15 and the access control server 3 generates an access response file. The access response file indicates that access is to be granted to printing functions of the printing machine 1. The access response file may provide additional details, such as, printing limits. For example, printing limits may specify a time period during which access is granted or a quantity of printing that is permitted. In a particular embodiment in which the printing machine 1 is a thermal transfer printer, the quantity of printing may advantageously be specified as a print distance (measured, for example, in lengths of ribbon). In other cases, where the printing machine 1 is, for example, an inkjet printer, the print distance may be measured in, for example, quantities of ink or number of ink cartridges. The access response file may be encrypted for subsequent decryption by the controller 2. For example, the access control server 3 may encrypt the access response file using a public key of the printing machine 1/controller 2 such that only the controller 2 can decrypt the access response file. By encrypting the access request file and the access response file, reverse engineering and abuse of the access granting mechanism is made more difficult.

The access control server 3 may additionally or alternatively sign all or part of the access response file using its own private key. In this way, the printing machine 1 can verify that the access response file has been issued by the access control server 3. It is to be understood that the use of asymmetric encryption is merely exemplary and that any encryption and verification mechanisms may be used.

Processing passes to step S16 and the access control server 3 updates the access control information stored in the database 5 in response to the issuance of the access response. For example, the access control server 3 may update the access control information to reflect the granting of access rights and to create a record of the access request. In this way, the access control server 3 can deny duplicate access requests. For example, if an access control request is intercepted by a third party, or if a user attempts to re-use an existing access control request, this can be detected by querying the access control information stored at the database 5.

At step S17, the access response file is transmitted from the access control server 3 for provision to the printing machine 1. It will be appreciated from the above that such transmission may be to the user device 4 or directly to the printing machine 1 in dependence upon the communication functionality of the printing machine 1. Where the access response file is transmitted to the user device 4, the user may provide the access response file to the printing machine 1. For example, the user may transfer the access response file from the user device 4 to an external storage device for subsequent transfer to the printing machine 1. In an alternative example, the user may transmit the access response file from the user device 4 to the printing machine 1 via a short range transmission protocol such as Bluetooth.

Referring again to FIG. 3a, when it is determined at step S3 that an access response file has been received, processing passes to step S4 and the controller 2 processes the access response data. For example, where the access response data is encrypted, the controller 2 may attempt to decrypt, verify that the received access response file is valid and originates from the access control server 3 and/or to verify that the access response data is for the printing machine 1. For example, the access response file may be decrypted by the controller 2 and the information stored therein compared to information stored in the local memory 2c. The comparison of the information in the access response file to stored information may include, for example, comparing a "signature" of the source of the access response file to an expected signature. Where the signature has been encrypted by the access control server 3 using its private key, for example, the controller 2 may decrypt the signature using the public key of the access control server 3 to verify that the access control server 3 is in fact the source of the access response file. Other information may be verified at step S4, such as, for example, determining whether the characteristics of the requested access in the access request (such as time periods, number of pages, quantity of ink, and/or length of ribbon) correspond to the characteristics in the access response file.

If it is determined, at step S5, that verification and/or decryption of the access response data is unsuccessful, processing passes to step S6 and access to the printing functions of the printing machine 1 is denied. A suitable message may be provided to the user to indicate that access to print functions will not be granted. If, on the other hand, verification of the access response file at step S5 is successful, processing passes to step S7 and access to print functions of the printing machine 1 is granted to the user in accordance with the details specified in the access response file.

Figure 4:
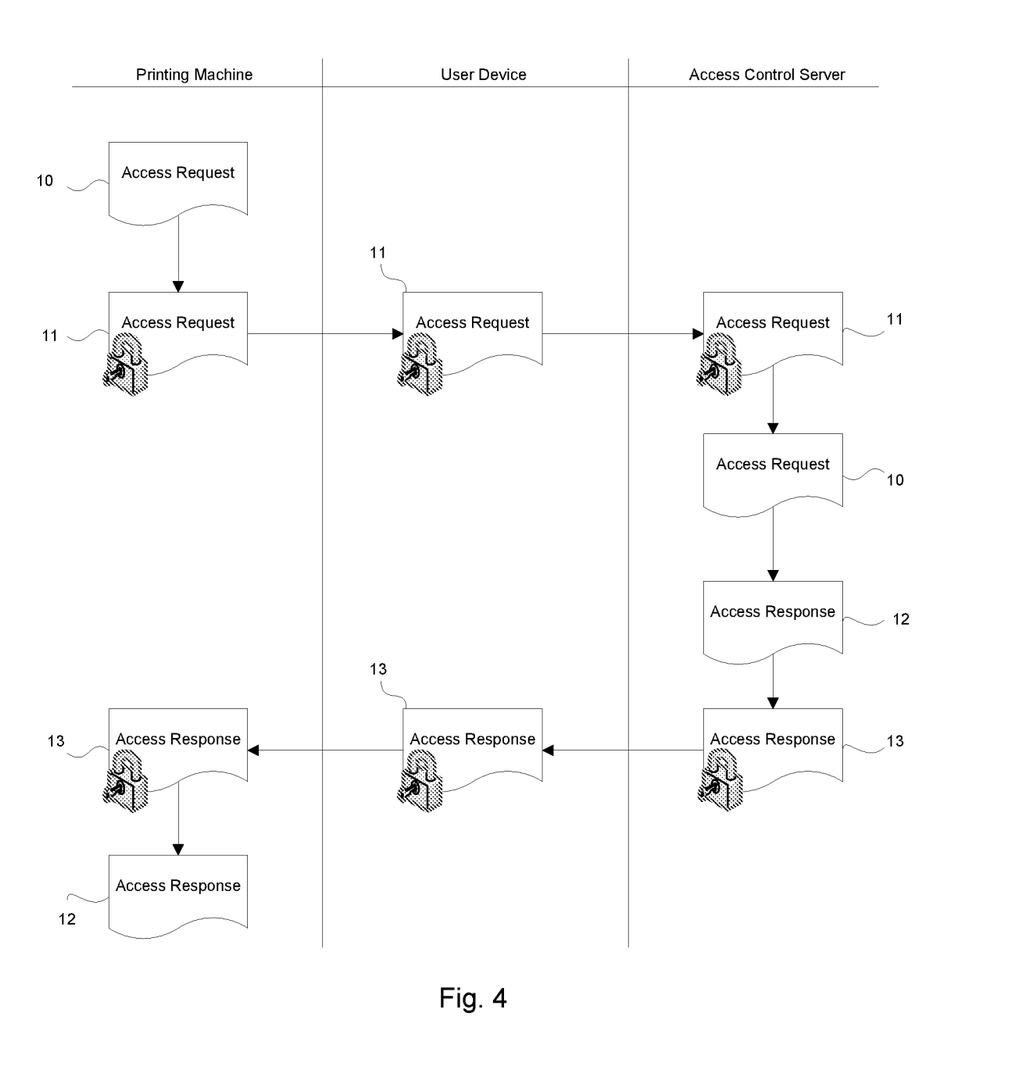
FIG. 4 schematically illustrates data transfers between components of the access control system in accordance with an example embodiment.

FIG. 4 schematically illustrates the transfer of access request and access response data in the system of FIG. 1 whereby the use device 4 provides an intermediary between the printing machine 1 and the access control server 3. In the example of FIG. 4, an access request file 10 is generated at the printing machine 1. The access request file 10 is encrypted and signed by the printing machine 1 to generate the encrypted access request file 11. The encrypted access request file 11 is provided to the user device 4, either through manual transfer or through transmission. The encrypted access request file 11 is transmitted to the access control server 3. The encrypted access request file 11 is decrypted and verified by the access control server 3, to obtain the access request file 10. The access request file 10 is used by the access control server 3 to generate an access response file 12. The access response file 12 is encrypted and signed by the access control server 3 to generate an encrypted access response file 13. The encrypted access response file 13 is transmitted to the user device 4 and subsequently provided to the printing machine 1. The printing machine 1 decrypts the encrypted access response file 13 to obtain the access response file 12.

Figure 5:
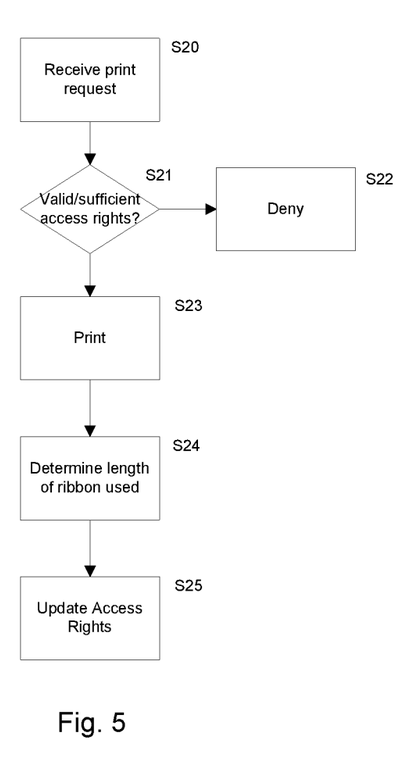
FIG. 5 is a flowchart showing processing that may be carried out by the access control server of FIG. 1.

The access status maintained by the controller 2 and stored in the local non-volatile storage 2c may include access rights. The controller 2 may update such locally stored access rights to be consistent with access rights granted in an access response file. FIG. 5 is a flowchart showing processing that may be carried out by the controller 2 in response to receiving a print request (i.e. a request to print material). In the example of FIG. 5, the printing machine 1 is taken to be a thermal transfer printer, and the access rights are taken to be provided in print distances. That is, a user is provided access to print a certain distance before further access rights are required. In the present example, the print distance is measure in lengths of ribbon, although it is to be understood that other measurements may equally be used. For example, where the printing machine 1 is an inkjet printer, the print distance may be measured in quantities of ink provided in one or more ink cartridges.

At step S20 the controller 2 receives a print request. At step S21, the controller 2 determines whether the printing machine has valid access rights. The access rights status of the printing machine 1 may be stored, for example, in a single bit in the local memory 2c. In some embodiments, the processing at step S21 may determine whether the remaining access rights are sufficient to complete the print request. For example, where the printing machine 1 is a thermal transfer printer, a determination may be made as to whether the existing access rights allow for a sufficient length of ribbon to complete the print request. It will be appreciated that details of the current access rights may be stored in any appropriate form in the local memory 2c.

If it is determined at step S21 that there are no valid access rights, or that the access rights are insufficient, processing ends at step S22 and the print request is denied. On the other hand, if it is determined at step S21 that the access rights are currently valid and sufficient, processing passes to step S23 and the print request is executed (i.e. requested material is printed). Processing passes to step S24 at which the length of print ribbon used in executing the print request is determined. Determining the length of ribbon used in executing the print request may be by any suitable method as will be apparent to the skilled person. For example, a length of ribbon may be calculated based on a line-density of ink on the ribbon, a line-density of the material to be printed and/or a detection of ribbon throughput.

Processing passes to step S25 at which the access rights stored in the local memory 2c are updated in response to the execution of the print request. For example, a "remaining length of ribbon" data item may be reduced to reflect the length of ribbon used in executing the print request.

As described above, it is to be understood that the print distance may not be measured in lengths of ribbon. For example, where the printing machine 1 is an inkjet printer, the print distance may be measured in quantities of ink provided within ink cartridges, or by numbers of ink cartridges. For example, at step S21 of FIG. 5, a determination may be made as to whether the existing access rights allow for a sufficient quantity of ink stored within an ink cartridge to be used to complete the print request, while at step S25 to update the access rights stored in the local memory 2c a "remaining quantity of ink" data item may be reduced to reflect the quantity of ink used in executing the print request.

It is to be understood that the processing described above with reference to FIGS. 3, 4 and 5 is merely exemplary. For example, while it is described above with reference to FIG. 5 that a print request is denied where there are insufficient access rights to complete the print request, in an alternative example embodiment, the user may be provided with the option to complete the print request to the extent possible with the currently access rights. Other modifications to the exemplary processing described above will be readily apparent to the skilled person in light of the foregoing.

Similarly, it will be appreciated that the arrangement of FIG. 1 is merely exemplary. For example, while the database 5 is depicted as being local to the access control server 3, it will be appreciated that in other embodiments the database 5 may be remote to the access control server 3 and accessibly via suitable connections. Similarly, while it is described above that the control server 3 maintains the access control information in the database 5, in other embodiments such maintenance may be performed by a different computing device and may be performed by a third party. For example, in some embodiments the printing machine 1 may be provided to a user by a distributor and communication between the user/printing machine 1/user device 4 and the access control server 3 may be via computing devices of the distributor. In such an embodiment, the access control information stored at the database 5 may include information about to the distributor. For example, a decision as to whether to grant access to printing functions of the printing machine 1 may be based upon characteristics of the distributor in addition to, or instead of, characteristics of the user or of the printing machine 1.

Various features of the printing machine have been described above. In some cases, exemplary components, configurations and methods suitable for realising these particular features have been described. However in many cases the skilled person will know of other components, configurations and methods which can similarly be used to realise the particular features which are described. Many of these components, configurations and methods will be known to the skilled person from the common general knowledge. It is envisaged that such alternative components, configurations and methods can be implemented in the described embodiments without difficulty given the disclosure presented herein.

While references have been made herein to a controller or controllers it will be appreciated that control functionality described herein can be provided by one or more controllers. Such controllers can take any suitable form. For example control may be provided by one or more appropriately programmed microprocessors (having associated storage for program code, such storage including volatile and/or non-volatile storage). Alternatively or additionally control may be provided by other control hardware such as, but not limited to, application specific integrated circuits (ASICs) and/or one or more appropriately configured field programmable gate arrays (FPGAs).

While various embodiments of printing machine(s) have been described herein, it will be appreciated that this description is in all respects illustrative, not restrictive. Various modifications will be apparent to the skilled person without departing from the spirit and scope of the invention.

The invention claimed is:

1. A printing machine comprising:
a processor;
a memory storing computer readable instructions arranged to cause the processor to:
generate an access request with access request data for processing by an access control server;
receive, from the access control server, access response data responsive to the access request data, the access response data including a first print limit wherein the first print limit is associated with a quantity of a marking medium available for printing on a material to be printed that is associated with a quantity of printing that is granted;
process the access response data to determine the first print limit indicated by the received access response data; and
update, responsive to processing the access response data, an access status in the memory to indicate a second print limit.

2. The printing machine of claim 1, wherein the computer readable instructions are arranged to cause the processor to encrypt and/or cryptographically sign the access request data.

3. The printing machine of claim 1, wherein the computer readable instructions are arranged to cause the processor to include a unique identifier of the printing machine in the access request data.

4. The printing machine of claim 3, wherein the computer readable instructions are arranged to cause the processor to process the access response data to verify that the access response data includes the unique identifier of the printing machine.

5. The printing machine of claim 1, wherein to process the access response data, the computer readable instructions are arranged to cause the processor to verify that the access response data originates at the access control server.

6. The printing machine of claim 1, wherein the computer readable instructions are arranged to cause the processor to update the access status from indicating a third print limit to indicate the second print limit.

7. The printing machine of claim 6, wherein the second print limit is at least one of a duration, a time period, a print distance, a length, a number of pages, a number of items, or a quantity of ink.

8. The printing machine of claim 1, wherein the computer readable instructions are arranged to cause the processor to:
receive a print request indicating the material to be printed;
to determine that the access status indicates that the print request may not be executed; and
to deny the print request.

9. The printing machine of claim 1, wherein the computer readable instructions are arranged to cause the processor to:
receive a second print request indicating second material to be printed;
to determine that the access status indicates that the second print request may be executed; and
to execute the second print request by printing at least a part of the second material to be printed.

10. The printing machine of claim 9, further comprising a marking medium comprising one of ribbon and ink and wherein the first print limit is the quantity of the marking medium and the instructions are arranged to cause the processor to update the access status to indicate a new print limit in response to executing the second print request wherein the new print limit is a new quantity of the marking medium available for printing.

11. The printing machine of claim 1, wherein the computer readable instructions are arranged to cause the processor to:
receive a third print request indicating third material to be printed;
to determine based on the access status stored in the memory that the third print request cannot be executed in its entirety; and
to refuse the third print request or to print only a part of the third material to be printed, the part being determined based upon the access status.

12. The printing machine of claim 11, wherein the access status specifies a print distance;
wherein to determine that the third print request cannot be executed in its entirety, the instructions are arranged to cause the processor to determine a print distance of the third material to be printed and to compare the print distance of the third material to a print distance specified in the access status.

13. The printing machine of claim 1, wherein the printing machine is a thermal transfer printer and the marking medium is a ribbon and the first print limit is a length of the ribbon.

14. The printing machine of claim 1, wherein the printing machine is an inkjet printer and the marking medium is ink and the quantity of the marking medium available for printing comprises a quantity of ink.

15. A system comprising:
a printing machine according to claim 1;
an access control server comprising a server processor and a memory storing computer readable instructions arranged to cause the server processor to:
receive access request data requesting access to a printing function of the printing machine;
process the access request data to determine an identifier of the printing machine;

retrieve access control information from the memory based on the determined identifier;

determine, based on the retrieved access control information, a first print limit;

generate access response data indicating the first print limit; and update the access control information stored in the memory to indicate issuance of the access response data.

16. The system of claim 15, wherein the instructions are arranged to cause the server processor to encrypt and/or cryptographically sign the access response data.

17. The system of claim 15, further comprising a user device comprising a user device processor and a memory storing computer readable instructions arranged to cause the user device processor to receive the access request data from the printing machine for onward transmission; and to receive the access response data.

18. The system of claim 15, further comprising a distributor device comprising a distributor device processor and a memory storing computer readable instructions arranged to cause the distributor device processor to:

receive the access request data; and transmit the access request data to the access control server.

19. The system of claim 18, wherein the instructions stored in the memory of the access control server are arranged to cause the server processor to determine, based on a distributor identifier in the access request data, that the request for access to the printing function may be granted.

20. The system of claim 18, wherein the instructions stored in the memory of the distributor device are arranged to cause the distributor device processor to:

receive the access response data from the access control server; and to transmit the access control data to the printing machine.

21. A method for controlling access to a printing function of a printing machine, comprising, at the printing machine:

generating an access request with access request data for processing by an access control server;

receiving, from the access control server, access response data responsive to the access request data, the access response data including a first print limit wherein the first print limit is associated with a quantity of a marking medium available for printing on a material that is associated with a quantity of printing that is granted;

processing the access response data to determine the first print limit indicated by the access response data; and updating, responsive to processing the access response data, an access status in the memory to indicate a second print limit.

22. A computer readable medium carrying computer readable instructions arranged to cause a processor to carry out the method of claim 21.

23. The printing machine of claim 1, wherein the request data includes data related to a quantity of marking medium to determine if access should be granted to authorize a printing operation.

* * * * *